Jan. 22, 1946. W. C. GREF Re. 22,712

FLUORESCENT TUBE

Original Filed Aug. 22, 1940

INVENTOR
William C. Gref
BY
Johnson, Kane and Smyth
ATTORNEYS

Reissued Jan. 22, 1946

Re. 22,712

UNITED STATES PATENT OFFICE 22,712

FLUORESCENT TUBE

William C. Gref, Westport, Conn., assignor, by mesne assignments, to The Wheeler Insulated Wire Company, Incorporated, Bridgeport, Conn., a corporation of Delaware Original No. 2,293,897, dated August 25, 1942, Serial No. 353,611, August 22, 1940. Application for reissue March 25, 1943, Serial No. 480,494

13 Claims. (Cl. 315—100)

The present invention relates to fluorescent tube circuits, and, more particularly, to the combination in which a resettable automatically operable switch is included in the starter means for the circuit.

In fluorescent tube circuits, the filaments of the tube are connected through a starter switch which temporarily closes the filament circuit in order to produce a current flow in the filaments to heat the filaments to a temperature such that the tube becomes activated and will discharge or arc over upon a proper voltage being applied thereto.

As the filaments become deactivated during use, they will not arc over when the predetermined voltage is applied, and, as a result, the starting means continues to heat the filaments and because of this abnormal condition damage results in the lighting circuit because of the abnormal load.

Also, if one of the filaments of the tube becomes shorted, a high current will flow through the starting means and also will place a load on the circuit.

To avoid these conditions, efforts have been made to provide a protecting means on the starter means by including a soft metal fuse within the starter can which melts upon an abnormal current flow in the circuit or a normal current flow of abnormal duration.

This method has not been entirely satisfactory, for the starter switches and fuse have been enclosed in a can or housing. When the fuse was destroyed, the entire starting unit, which, under normal conditions, would operate for many hours, had to be discarded. Thus, the life of the starter unit was materially reduced. Further, inasmuch as the fuse was enclosed in the can, it was difficult, from inspection, to determine whether or not the switch or fuse had been destroyed or whether the trouble was in another portion of the circuit.

To avoid disadvantages heretofore encountered in the circuit, the present invention provides, in the starter, an automatic switch means which will open the circuit after a predetermined interval should the current be excessive or should the normal current pass through the switch for an abnormal time.

This is accomplished by replacing the fuse in the starter unit with an automatically operable switch which may be reset after it has been caused to operate to open the circuit.

While the switch may take many forms, in the preferred form of the invention it comprises a heat-responsive switch having one of the contacts normally urged into open-circuit position, but held in closed-circuit position by a heat-responsive detent or the like. The movable member of the switch is provided with a button or manual operator which is normally disposed within the housing, but, upon operation of the switch to open the circuit, projects beyond the housing. This not only provides a manual actuator for resetting the switch, but also an indicator for signaling that the circuit has been opened at the starter switch.

Should there be difficulty in the circuit, such as the tubes becoming deactivated and the automatic switch in the starter open, the user of the device will be immediately apprised of this fact and can remedy the situation. On the other hand, should the lights fail to operate and the automatic switch remain closed, the user of the device will know at once that the difficulty is not with the starter means but with some other portion of the circuit.

After the switch has opened the circuit and the user has corrected the trouble, the switch can be again closed and the heating circuit established. In the event that the trouble has not been entirely corrected, the switch will again operate to open the circuit and the trouble can be traced further. It will be apparent from this operation that a great saving in starting units will be had and a greater efficiency in the lighting circuit obtained.

Other features and advantages of the invention will be apparent from the specification and claims when considered in connection with the drawing, in which:

Figure 1:
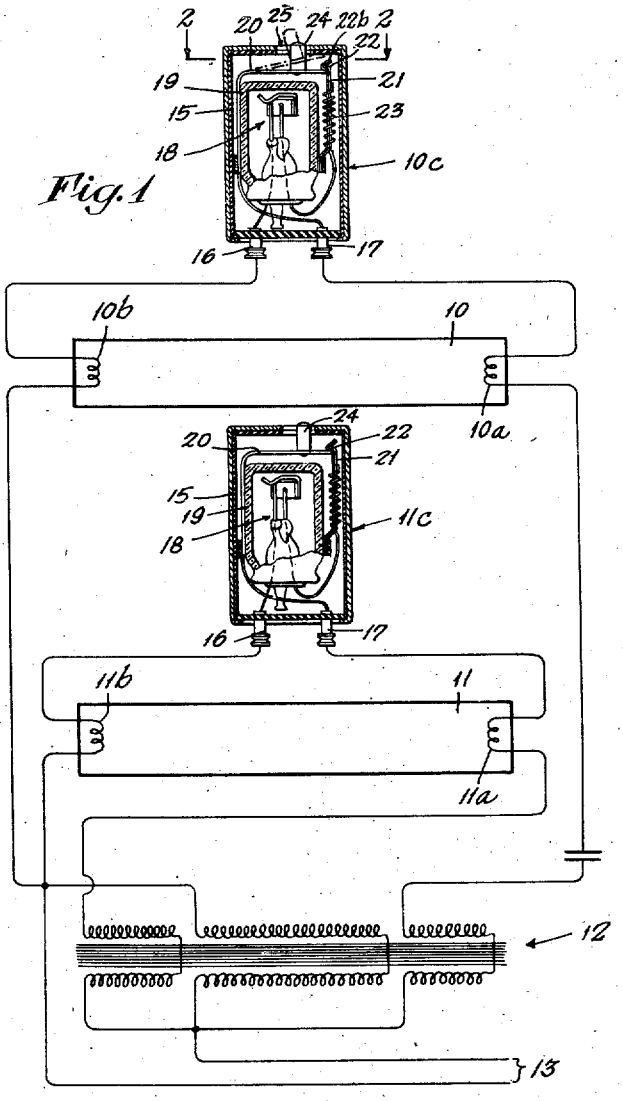
Figure 1 shows a diagrammatic view of a fluorescent tube circuit showing two tubes with starter means therefor partly in section.
Figure 2:
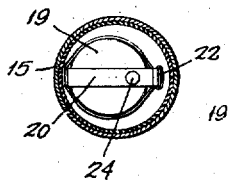
Fig. 2 is a sectional view of the starter unit, taken along lines 2—2 of Fig. 1.

In the drawing, two fluorescent tubes 10 and 11 are shown. It is to be understood that the present invention is applicable to circuits of one or more tubes and that the present illustration is used to facilitate description of the invention.

The fluorescent tube 10 is provided with filaments 10a, 10b which are located in each end thereof and are connected together through a starter circuit, including an automatic can starter 10c to form a heating circuit therefor. The filaments are also connected to a suitable source of power indicated at 12. The source of power may be an autotransformer as illustrated in the drawing, or a choke coil connected across the power line 13.

The fluorescent tube 11 similarly has filaments 11a and 11b located at either end thereof and the filaments are connected into a heating circuit, including an automatic starter 11c. The filaments are also connected across the power supply 12.

The starter units, which are shown in section, are similar and comprise a can or housing 15 having terminals 16, 17 in the bottom thereof for connection into the heating circuit. Terminal 16 is connected to one element of the starter switch 18 which is enclosed in a glass tube 19. The other element of the switch 18 is connected to one contact of the resettable switch of the present invention, and the other contact of the resettable switch is connected to the terminal 17.

In the illustrated form of the invention, the automatic operable resettable switch comprises a resilient or spring contact member 20 scured to the glass tube 19 and extending across the top thereof. Positioned in spaced relation with contact 20, preferably on the opposite side of the glass tube is a bimetallic arm 21 forming the other contact of the switch. The arm has a latch or detent 22 formed at the free end thereof, and the other end secured to the glass tube. The two contacts may be secured in any manner to the tube, as, for example, by means of a strip of insulating material, cambric, or the like.

The latched end 22 of the arm 21 extends into the path of movement of the contact 20 and interlocks therewith when the contact is moved to closed position to hold the circuit closed. The end 22b of the detent provides a cam surface for shifting the arm as the contact 20 is moved into position. The bimetallic contact with its detent will normally hold the circuit closed. When the bimetallic arm is heated upon an abnormal condition, however, it will flex and release the contact 20 which springs to open position.

The bimetallic arm 21 may be of such cross-section that the normal current passing therethrough will not heat it sufficiently to cause it to flex during the operation of the switch 18, but which will cause the same to be heated by abnormal current passing therethrough and cause it to flex to release the contact 20.

If desired, the bimetallic arm can be provided with a heating member 23, as shown in Fig. 1, which is connected to the element of the switch 18 so that the current in the heating circuit will pass therethrough and provide the heat necessary to flex the bimetallic member 21.

As is shown in Fig. 1, the contact 20 is provided with a projecting member 24 which is disposed adjacent an opening 25 in the housing. When the switch is in closed position, the member 24 lies substantially within the housing. However, upon the switch being operated to open the heating circuit, the member 24 moves from the position shown in the lower starter of Fig. 1 to the position shown in dotted lines in the upper starter in Fig. 1 so that it projects substantially beyond the outer surfaces of the housing or can and serves as a means whereby the switch can be manually reset.

The projecting portion also serves as an indicator of the condition of the switch so that the user of the device can readily perceive that the circuit has been opened in the starter unit and remedy the situation which would cause the current in the starter circuit to be abnormally large or cause the normal current to remain for an abnormal time.

If the fluorescent tube should fail to operate and the circuit remain closed in the starter, then the user would have an indication that there was an open line or other trouble elsewhere in the circuit.

Figure 3:
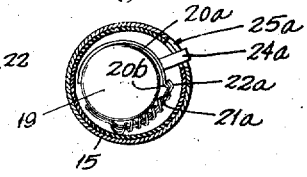
Fig. 3 is a sectional view, similar to Fig. 2, showing a modified form of the invention.

In some installations, it is impractical to have the reset button to project from the end of the housing can, as shown in Fig. 1, because of space requirements. In such instances, the switch of the present invention may be arranged in the starter can so that it projects from the side thereof, as shown in Fig. 3. In this construction, the spring contact 20a is positioned so as to extend around the tube 19 and have the projection 24a extend through an opening 25a in the side of the housing.

If further space limitations present themselves so that the member 24 cannot be projected through the housing, then the contact may be suitably colored to show through the opening and an instrument made of insulating material provided to be inserted through the opening to reset the contact when desired.

The spring contact 20a, which is held closed by the detent 22a on the bimetallic contact arm 21a, is provided with a cam surface 20b which moves the detent 22a to permit the contacts to become interlocked. As is shown in Fig. 3, the contacts are secured to the tube 19 so as to extend around the side thereof.

While in the two forms of the invention illustrated the switch contacts have been mounted on the tube 19, they may, if desired, be secured to the inner surface of the can and insulated therefrom or be otherwise mounted in the can.

In the broader aspects of the invention, there is provided within the housing of the automatic starter means an automatically operated resettable switch which will be operated to permanently open the circuit upon an abnormal condition therein after a predetermined time interval, which switch can be manually reset upon correction of the condition producing the abnormal condition.

Variations and modifications may be made within the scope of this invention and portions of the improvements may be used without others.

I claim:

1. In a fluorescent tube circuit, a fluorescent tube; protected starter means in the filament circuit of the tube for automatically temporarily closing said circuit to heat the filaments and cause the tube to become conductive and to repeat said operation until said tube becomes conductive; and means for supplying a proper voltage to the tube to maintain the tube conductive, said protected starter means comprising a housing enclosing an automatic electron switch and a heat-responsive switch carried by the electric switch adapted to open the circuit upon being heated by an abnormal current flow therethrough and by heat caused by abnormal repeated operations of said switch and transferred from said electron switch, said heat-responsive switch being normally urged to open-circuit position and having means thereon adapted to project from the housing when the switch is in open-circuit position to indicate the condition of the starter means and form a means for resetting the heat-responsive switch.

2. In a fluorescent tube circuit, a fluorescent tube; protected starter means in the filament circuit of the tube for automatically temporarily closing said circuit only for a period sufficient to heat the filaments and cause the tube to become conductive and repeat said periods of operation to heat said filaments until said tube becomes conductive; and means for supplying a proper voltage to the tube to maintain the tube conductive, said starter means having an automatic starter switch sealed in a tube of insulating material, a spring contact carried by the tube, and a bimetallic latch contact carried by the tube in spaced relation with the spring contact and cooperating therewith to hold the circuit closed, the contacts being in series with the starter switch and the spring contact being normally urged to open-circuit position, said bimetallic latch contact being heated by heat caused by repeated operations of the switch and transferred from the tube and by an abnormal current condition in the circuit and releasing the spring contact for movement into open-circuit position, and means carried by the spring contact for manually returning the spring contact to closed-circuit position.

3. In a fluorescent tube circuit, a fluorescent tube; protected starter means in the filament circuit of the tube for automatically temporarily closing said circuit to heat the filaments and cause the tube to become conductive and to repeat said operation until said tube becomes conductive; means for supplying a proper voltage to the tube to maintain the tube conductive, said starter means having a housing enclosing an electron switch sealed in a tube of insulating material, a spring contact carried by the tube, and a bimetallic latch contact carried by the tube in spaced relation to the spring contact and cooperating with the spring contact to hold the circuit closed, the contacts being disposed within the housing and connected in series with the starter switch with the spring contact being normally urged to open-circuit position, said bimetallic latch contact being heated by heat from the electron switch tube and by an abnormal current condition in the circuit and flexing to release the spring contact for movement into open-circuit position; and means carried by the spring contact and projecting beyond the housing when the switch is in open-circuit position for indicating the condition of the circuit and providing a manual actuator for returning the spring contact in cooperative relation with the latch contact to close the circuit.

4. A protected starter unit to be used in the filament circuit of a fluorescent tube comprising a housing, an automatic starter switch means enclosed therein to be connected in the filament circuit of the fluorescent tube for temporarily closing said circuit to heat the filaments and cause said tube to become conductive and to repeat said operation until said tube becomes conductive, and a resettable switch in said circuit and carried by the starter means within the housing and adapted to permanently open the circuit upon repeated operations of the starter means or change from a normal condition in the starter means.

5. A protected starter unit to be used in a fluorescent tube circuit, comprising a housing: an automatic starter means including a switch enclosed by said housing and adapted to be connected in the filament circuit of the tube for temporarily closing a heating circuit for the filaments for a period sufficient to heat the filaments to cause the tube to become conductive and to repeat said operation until said tube becomes conductive; a separate resettable switch connected in series with the starter means and carried by the starter means, said switch being operated to permanently open the circuit upon repeated operations of the starter means or an abnormal condition in said starter means; and means controlled by the resettable switch for indicating the position of said switch in the heating circuit.

6. A protected starter unit to be used in the filament circuit of a fluorescent tube, comprising a housing; an automatic switch means, surrounded by the housing, to be connected in the filament circuit of the tube and operable for closing a heating circuit to the filaments; and separate control means in said circuit, said means being carried by the automatic switch means and enclosed by said housing and being responsive to abnormal current in the heating circuit for opening the circuit comprising a switch urged to open-circuit position, a heat-responsive member for normally maintaining said switch closed and for releasing the switch upon passage of an abnormal current in the filament circuit, and a manual operator carried by the movable switch part and moved to the exterior of the housing when the switch is in open-circuit position whereby the switch can be engaged and again moved into closed-circuit position.

7. A protected automatic starter unit to be inserted in the filament circuit of a fluorescent tube, comprising a housing having terminals thereon for connection to the filaments of said fluorescent tube; an automatic starter switch sealed in a tube of electrical insulating material and disposed in said housing, said switch being connected across said terminals for temporarily closing said circuit to cause the fluorescent tube to become conductive and repeating the circuit-closing operation until said tube does become conductive, a spring contact, and a bimetallic latch contact carried by the tube, in spaced relation with one another and connected in series with the switch circuit, the spring contact being normally urged to open-circuit position and the bimetallic latch contact cooperating with the spring contact to hold the circuit closed, said bimetallic latch contact being heated upon an abnormal current condition in the circuit and by heat, caused by repeated operations of said automatic starter switch or an abnormal condition in said starter switch, transferred from the tube surrounding said starter switch and releasing the spring contact for movement into open-circuit position; and indicator means rigidly carried by the spring contact and movable thereby to project beyond the housing when the switch in its open-circuit position is indicating the condition of the circuit and providing a manual actuator for returning the spring contact into cooperative relation with the latch contact to again close the circuit.

8. A fluorescent lamp; a starting circuit in parallel with said lamp; a starting switch in said starting circuit for starting the lamp in operation, said switch operating when the lamp is out and starting voltage is applied thereto to effect repeated opening and closing of said starting circuit until the lamp lights; a choke coil in series with said lamp operable each time the starting circuit is broken to induce a relatively high voltage across said lamp for lighting the lamp; and a protective switch connected in series with said starting switch in said starting circuit, said protective switch being biased to open position and having means for latching it in closed position and means operable to release said latching means to effect the opening of said protective switch to break said starting circuit in the event the continued operation of said starting switch fails to start said lamp in operation within a predetermined time interval after the initial operation of said starting switch.

9. A fluorescent lamp having heater electrodes in the ends thereof; a choke coil in series with said lamp; a starting circuit in parallel with said lamp; a starting switch having contacts in said starting circuit, and means operable upon the connection of the lamp to its source to cause the engagement of said contacts to complete said starting circuit and thereupon acting to effect the separation of said contacts to break said starting circuit, said choke coil acting upon the breaking of said starting circuit to induce a relatively high voltage across said lamp electrodes to light said lamp, said means causing the repeated engagement and separation of said contacts in the event said lamp fails to light but causing them to remain separated after the lamp lights; and a protective switch connected in series with said starting switch in said starting circuit, said protective switch comprising a pair of contacts, means biasing said protective switch contacts to disengaged condition, a latch for holding said protective switch contacts in engagement against the force of said biasing means, and means controlled by the flow of current in said starting circuit for releasing said latch to effect the separation of said protective switch contacts and thus break said starting circuit in the event the continued operation of said starting switch fails to start said lamp in operation within a predetermined time interval after connection of said lamp to said source.

10. A fluorescent lamp having heater electrodes in the ends thereof; a chock coil in series with said lamp; a starting circuit in parallel with said lamp; a starting switch in said starting circuit, said starting switch having a stationary contact and a movable contact, and means operable upon the connection of the lamp to its source to cause the engagement of said contacts to complete the starting circuit connecting said lamp electrodes in series to said source, said means acting to effect the disengagement of said contacts after the completion of the starting circuit to break said circuit, said choke coil acting upon the breaking of said starting circuit to induce a relatively high voltage across said lamp electrodes to light said lamp, such operation being repeated in the event said lamp fails to light until the lamp lights; and a protective switch connected in series with said starting switch in said starting circuit, said protective switch comprising a contact spring, a bimetallic strip having a hooked end for engaging the end of the contact spring to latch it in a state of tension, said ends of said protective switch bimetallic strip and contact spring serving as contacts, and heating means for said protective switch bimetallic strip operable to cause the bending of said protective switch bimetallic strip under the influence of heat to unlatch the contact spring and thus break said starting circuit in the event the continued operation of said starting switch fails to start said lamp in operation within a predetermined time interval after connection of said lamp to said source.

11. In a fluorescent lamp circuit, a fluorescent lamp, an inductance in series with said lamp; starting switch means in the starter circuit for the lamp for temporarily closing the lamp circuit to cause said lamp to become operative, the operation of said starting switch means being repeated until said lamp becomes operative; protective switch means in the starter circuit connected in series with said starting switch and maintaining the circuit closed during normal starting and restarting of the lamp and movable to permanently open the circuit only upon excess operation of said starting switch; and means for resetting the protective switch means to closed-circuit position in response to a manual operation.

12. In a fluorescent lamp circuit, a fluorescent lamp, an inductance in series with said lamp; starting switch means in the starter circuit for the lamp for temporarily closing the lamp circuit to cause said lamp to become operative, the operation of said starting switch means being repeated until said lamp becomes operative; bimetallic switch means in the starter circuit and connected in series with said starting switch and movable to permanently open the circuit only upon excess operation of said starting switch; and means for resetting the bimetallic switch to closed-circuit position in response to a manual operation.

13. A fluorescent lamp; a starting circuit in parallel with said lamp; a switch in said starting circuit for starting the lamp in operation, said switch operating when the lamp is out and starting voltage is applied thereto to effect repeated opening and closing of said starting circuit until the lamp lights; an inductance in series with said lamp operable each time the starting circuit is broken to induce a relatively high voltage across said lamp for lighting the lamp; a protective switch connected in series with said starting switch in said starting circuit, said protective switch maintaining the starting circuit closed during normal starting and restarting of the lamp and movable to permanently open the circuit only upon excess operation of the starting switch after the initial operation of said starting switch; and manually operable means for resetting the protective switch after the circuit has been opened thereby.

WILLIAM C. GREF.